US012322834B2

United States Patent
Yang et al.

(10) Patent No.: US 12,322,834 B2
(45) Date of Patent: Jun. 3, 2025

(54) SOFT PACK BATTERY MODULE AND ITS ELECTRICITY SUPPLY THEREOF

(71) Applicants: PROLOGIUM TECHNOLOGY CO., LTD., Taoyuan (TW); Prologium Holding Inc., Grand Cayman (KY)

(72) Inventors: Szu-Nan Yang, Taoyuan (TW); Meng-Hung Wu, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 141 days.

(21) Appl. No.: 17/667,820

(22) Filed: Feb. 9, 2022

(65) Prior Publication Data

US 2022/0302557 A1 Sep. 22, 2022

(30) Foreign Application Priority Data

Mar. 18, 2021 (TW) .................. 110109697

(51) Int. Cl.
*H01M 50/531* (2021.01)
*H01M 50/105* (2021.01)
(Continued)

(52) U.S. Cl.
CPC ....... *H01M 50/531* (2021.01); *H01M 50/105* (2021.01); *H01M 50/119* (2021.01); *H01M 50/1243* (2021.01)

(58) Field of Classification Search
CPC ............. H01M 50/531; H01M 50/105; H01M 50/119; H01M 50/1243
See application file for complete search history.

(56) References Cited

U.S. PATENT DOCUMENTS 5,478,667 A * 12/1995 Shackle ............ H01M 10/6563
429/153
2007/0065718 A1 3/2007 Moon
(Continued)

FOREIGN PATENT DOCUMENTS

AU 2021101083 A4 4/2021
CN 101107731 A 1/2008
(Continued)

OTHER PUBLICATIONS

Extended European Search Report issued Aug. 25, 2020 in Application No. 22157908.9.
(Continued)

*Primary Examiner* — Matthew T Martin
*Assistant Examiner* — Taylor Harrison Krone
(74) *Attorney, Agent, or Firm* — RABIN & BERDO, P.C.

(57) ABSTRACT

The invention provides a soft pack battery module and its electricity supply thereof. The battery units, which are independent and complete modules, are utilized to be contacted to each other to form the battery cell with the serial connection, the parallel connection or both. There only have charges transferred rather than electrochemical reactions occurred between the battery units. Also, the metallized plastic film package is utilized to pack the battery cell. The inner electrically-conductive area of the metallized plastic film package is directly contacted to the electric power outputs of the battery cell to form electrical connections. Therefore, the problems caused by the need for additional wires can be avoided and the surface area the current path of the battery cell can be maximized.

13 Claims, 15 Drawing Sheets

(51) Int. Cl.
*H01M 50/119* (2021.01)
*H01M 50/124* (2021.01)

(56) References Cited

U.S. PATENT DOCUMENTS

| | | | |
|---|---|---|---|
| 2015/0243948 | A1 | 8/2015 | Chuang et al. |
| 2016/0254565 | A1 | 9/2016 | Wakimoto et al. |
| 2017/0077487 | A1 | 3/2017 | Coakley et al. |
| 2019/0123326 | A1* | 4/2019 | Yang .................. H01M 50/105 |
| 2019/0296389 | A1* | 9/2019 | Sakawaki ........... H01M 50/121 |
| 2020/0052000 | A1* | 2/2020 | Yang ................. H01M 10/4235 |
| 2020/0052341 | A1 | 2/2020 | Yang |
| 2022/0021046 | A1* | 1/2022 | Shi ....................... H01M 50/112 |
| 2022/0336818 | A1* | 10/2022 | Nasu .................... H01M 4/663 |

FOREIGN PATENT DOCUMENTS

| | | |
|---|---|---|
| CN | 105932214 A | 9/2016 |
| CN | 106058100 A | 10/2016 |
| CN | 109860445 A | 6/2019 |
| CN | 110416442 A | 11/2019 |
| EP | 3392926 A1 | 10/2018 |
| JP | 2003331819 A | 11/2003 |
| JP | 2005276486 A | 10/2005 |
| JP | 2007122977 A | 5/2007 |
| JP | 2008159328 A | 7/2008 |
| JP | 2008529237 A | 7/2008 |
| JP | 2017088420 A | 5/2017 |
| JP | 2021034141 A | 3/2021 |
| WO | 2021033706 A1 | 2/2021 |

OTHER PUBLICATIONS

Office Action issued Jul. 29, 2024 in correspondence KR application No. KR10-2022-0026181.

* cited by examiner

SOFT PACK BATTERY MODULE AND ITS ELECTRICITY SUPPLY THEREOF

CROSS REFERENCES TO RELATED APPLICATIONS

The present application claims priority to Taiwanese Patent Application 110109697 filed in the Taiwanese Patent Office on Mar. 18, 2021, the entire contents of which is being incorporated herein by reference.

BACKGROUND OF THE INVENTION

Field of Invention

The present invention relates to a battery module, in particular to a soft pack battery module and its electricity supply thereof, which is composed of a battery cell, stacked by the battery units with complete and individual package, and a metallized plastic film package to seal thereof.

Related Art

The aluminum plastic film is the key for the package of the soft pack battery. Because of its advantages of light weight, thin thickness and flexible design, the soft pack battery with the aluminum plastic film can be widely used in various fields. In terms of composition, the aluminum plastic film is sequentially composed of the outermost nylon layer, the middle aluminum foil layer, and the innermost heat-sealing inner layer. Therefore, the battery cell is sealed by the aluminum plastic film to form the soft pack battery.

Generally speaking, the aluminum plastic film needs to have very good barrier and heat sealing properties to isolate the external moisture and oxygen from infiltrating the internal battery cells. Also, it must be resistant to internal strong acids such as electrolytes or organic solvents to avoid being eroded by internal electrolytes or organic solvents to decrease or destroy its barrier properties.

Therefore, the electricity power of the internal battery cell only can be guided from the gap of the aluminum plastic film. For example, please refer to Chinese patent applications, such as CN109860445A and CN110416442, the button battery with the aluminum plastic film are disclosed. One end of the positive/negative terminals are connected to the positive/negative plates, and the other end of the positive/negative terminals are drawn out from the gap between the upper and lower shells of the aluminum plastic films. However, the current path cannot be maximized of this structure, and the transmission loss is large. Moreover, because of the higher resistance, it is easier to generate heat, which seriously affects the stability of the battery cell.

Therefore, this invention provides a soft pack battery module and its electricity supply thereof to mitigate or obviate the aforementioned problems.

SUMMARY OF THE INVENTION

It is an objective of this invention to provide a soft pack battery module and its electricity supply thereof. The battery cell is stacked by the battery units with complete and individual package. And the inner and outer electrically-conductive areas of the metallized plastic film package are used to form electrical connections with the current collectors of the battery cell. Therefore, the current path of the battery cell can be maximized.

In order to implement the abovementioned, this invention discloses a soft pack battery module, which includes a battery cell and a metallized plastic film package. The battery cell includes a plurality of stacked battery units. The stacked battery units are connected in series, in parallel or both, and each battery unit has an individual package to make charge transfer occurring between adjacent two of the battery units without electrochemical reaction. The metallized plastic film package is composed of two sheets. Each sheet has an inner surface and an outer surface. The inner surface has an inner electrically-conductive area and the outer surface having an outer electrically-conductive area. The inner electrically-conductive area is electrically connected with the outer electrically-conductive area. The sheets are adhered to each other via an adhesion layer, and the inner surfaces are opposed to each other. The battery cell is disposed within the two sheets. The two electric power outputs of the battery cell are electrically connected with the inner electrically-conductive areas of the two sheets respectively. The electricity power of the battery cell can be transmitted via the outer electrically-conductive areas of the two sheet to make the current path of the battery cell be maximized.

Also, a fire retardant is filled between the metallized plastic film package and the battery cell to enhance the safety of the battery module.

Moreover, this invention discloses an electricity supply, which includes a first electrically insulating layer, a second electrically insulating layer and a plurality of above-mentioned soft pack battery modules. The first electrically insulating layer includes a first patterned metal layer and the second electrically insulating layer includes a second patterned metal layer. The second patterned metal layer is opposed to the first patterned metal layer. These soft pack battery modules are arranged to form at least one vertical group to dispose and distribute between the first electrically insulating layer and the second electrically insulating layer. Each of the vertical groups includes at least one soft pack battery module. The outer electrically-conductive areas of the outermost soft pack battery module of the vertical group are directly contacted to the first patterned metal layer and the second patterned metal layer to form electrical connections in a horizontal direction parallel to the first electrically insulating layer and the second electrically insulating layer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

Figure 1A:
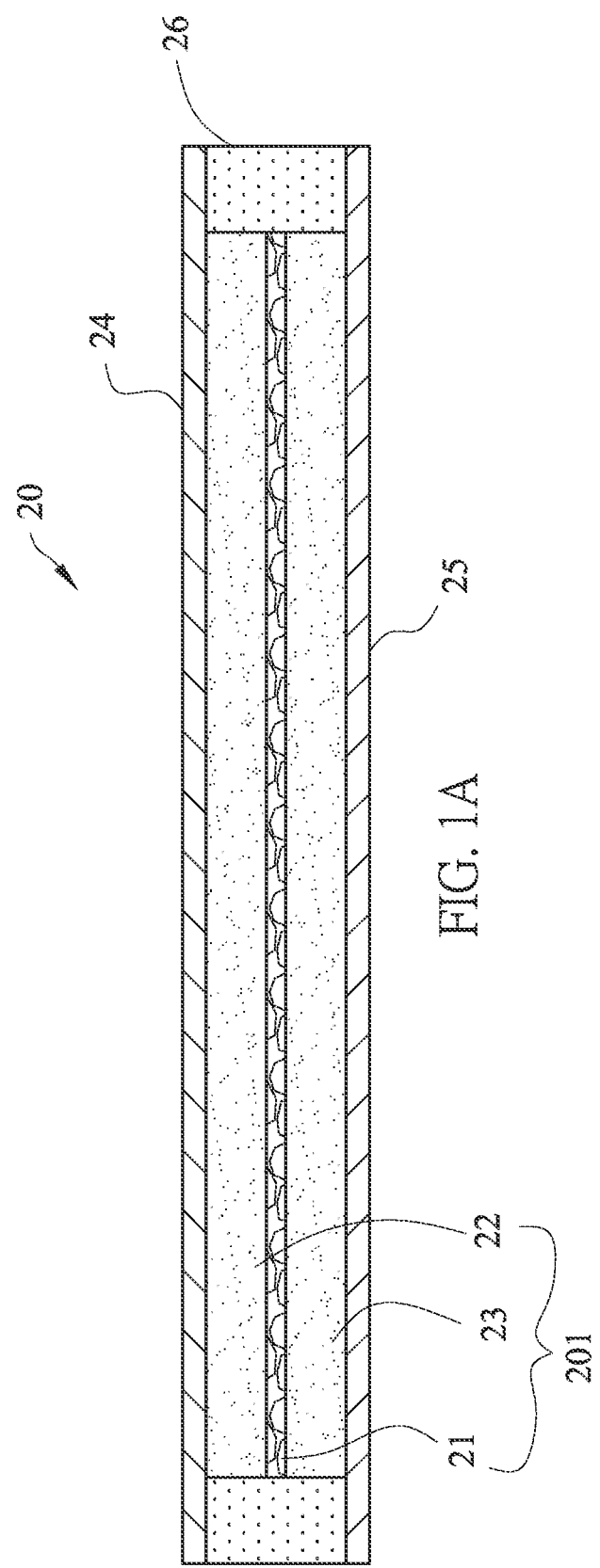
FIG. 1A is a schematic diagram of an embodiments of the battery unit of the soft pack battery module of this invention.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

In the description of the present invention, it should be noted that the terms "installation", "connected", and "disposed" are to be understood broadly, and may be fixed or detachable, for example, can be mechanical or electrical, can be connected directly or indirectly, through an intermediate medium, which can be the internal connection between two components. The specific meanings of the above terms in the present invention can be understood in the specific circumstances by those skilled in the art.

Figure 1B:
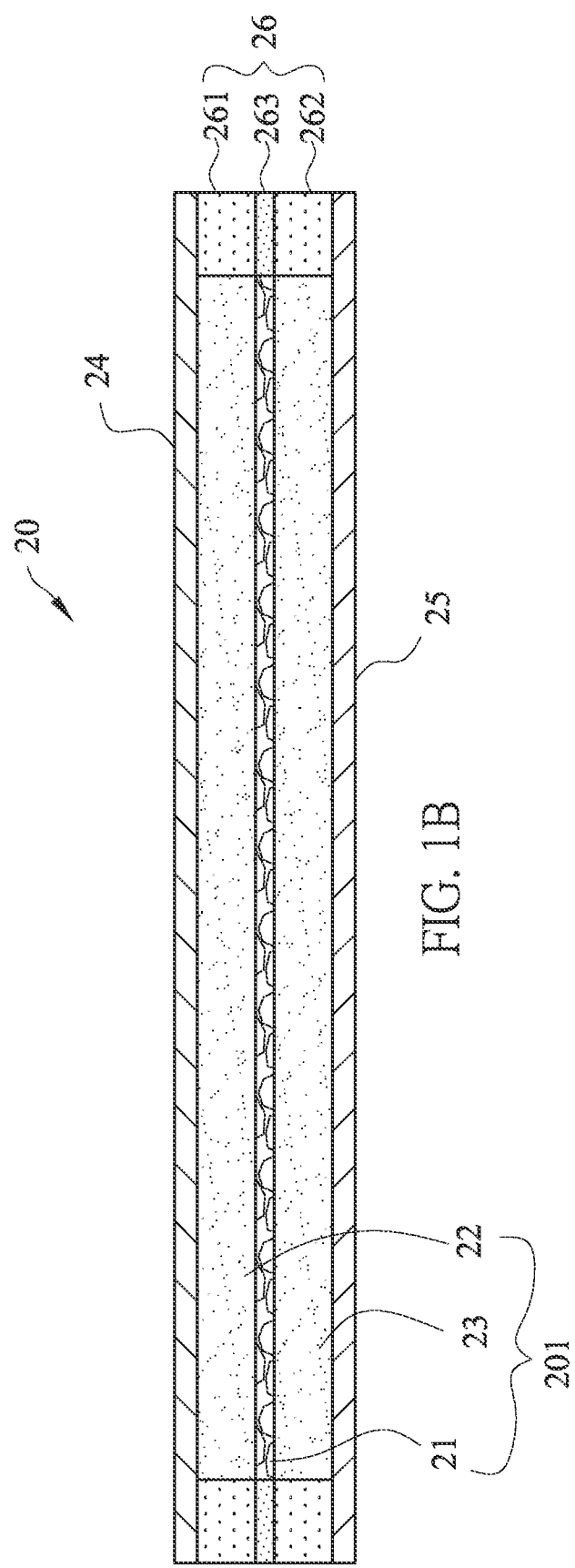
FIG. 1B is a schematic diagram of another embodiments of the battery unit of the soft pack battery module of this invention.
Figure 1C:
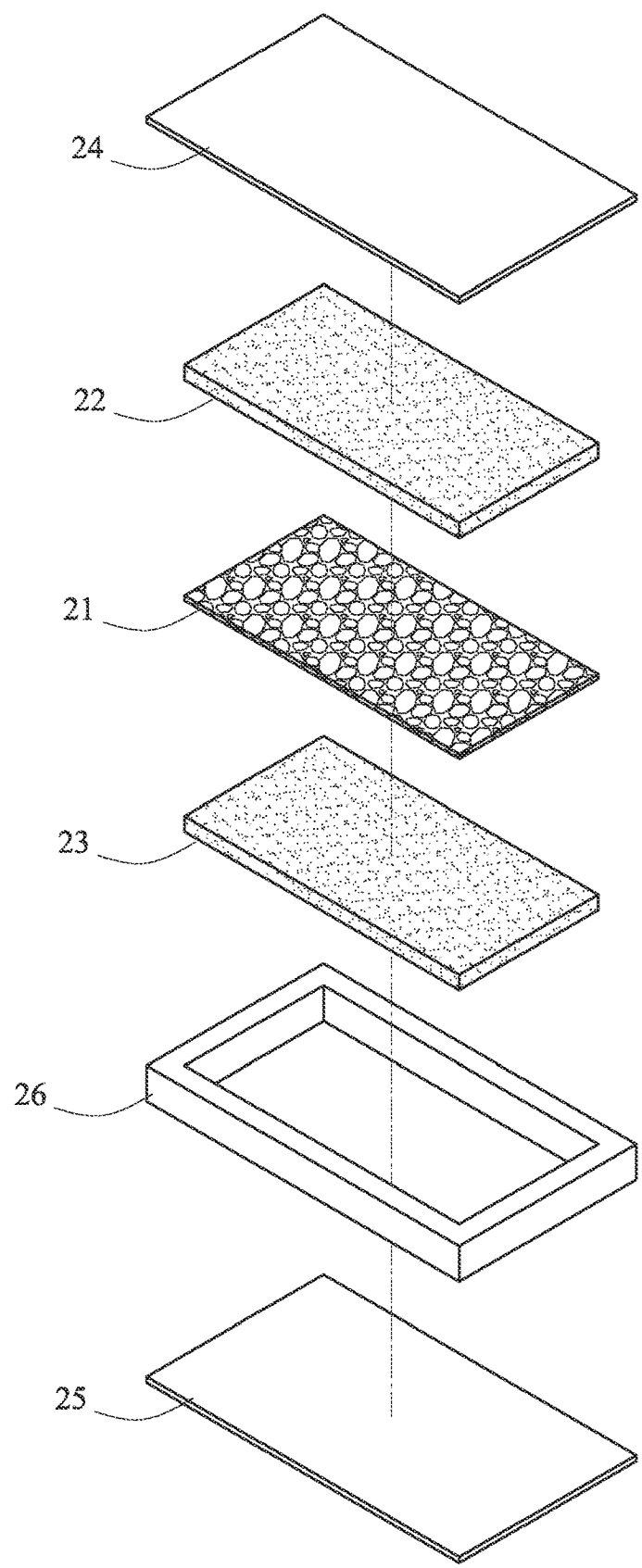
FIG. 1C is an exploded diagram of an embodiments of the battery unit of the soft pack battery module of this invention.

The soft pack battery module of this invention includes a battery cell, which is formed by stacking a plurality of battery units 20 with independent, sealed and complete module, and a metallized plastic film package to pack the stacked battery units 20 to form a quasi-coin battery module. First, the battery unit 20 is described below. Please refer to FIGS. 1A and 1C, the battery unit 20 of this invention includes two current collectors 24, 25, an electrochemical system 201 and a sealing frame 26. The electrochemical system 201 includes a separator 21, two active material layers 22, 23 and an electrolyte system impregnated or mixed in the active material layers 22, 23. The separator 21 may be a porous lamination formed by polymers or the glass fibers, or the separator 21 may be a ceramic separator, which is stacked or sintered by ceramic materials, with pores to permit ion migrations. The pores are through holes or ant holes, i.e. non-straight through holes. Moreover, the separator 21 may be the porous lamination with a ceramic particles reinforcing layer, or a separator mixing with ceramic particles and ion-conductive polymers. The size of the ceramic particles are nanometer scale, micrometer scale or mixing with at least two larger different scale, such as mixing with nanometer scale and micrometer scale. The material of the ceramic particles is $TiO_2$, $Al_2O_3$, $SiO_2$, alkylated ceramic particulates, or an oxide-based solid electrolyte, such as LLZO (lithium lanthanum zirconium oxide, $Li_7La_3Zr_2O_{12}$) or LATP($Li_{1+x}Al_xTi_{2-x}(PO_4)_3$). Further, the ceramic material may be mixed with the ceramic insulating materials and the oxide-based solid electrolyte. The separator 21, in case of being stacked by ceramic materials, may further include a polymer adhesive used to bind these ceramic particles. The polymer adhesive may be polyvinylidene fluoride (PVDF), polyvinylidene fluoride co-hexafluoropropylene (PVDF-HFP), Polytetrafluoroethene (PTFE), acrylic acid glue, epoxy resin, polyethylene oxide (PEO), polyacrylonitrile (PAN), and polyimide (PI). The metallized plastic film package may be composed of an aluminum plastic film.

The electrolyte system is impregnated or mixed in the active material layers 22, 23. The electrolyte system is a gel electrolyte, a liquid electrolyte, a polymer solid electrolyte, an ionic liquid or a combinations thereof. The active material layers 22, 23 are separated by the separator 21 to form the electrochemical system 201. Therefore, the processes that the chemical energy is converted into electrical energy, i.e. discharging, and the electrical energy is converted into chemical energy, i.e. charging, are carried out. The ion migration and transport are achieved. The electric charges are transmitted via the current collectors 24, 25, which are disposed on outer sides of the active material layers 22, 23, respectively. The materials of the current collectors 24, 25 are copper (Cu), Aluminum (Al), or nickel (Ni), tin (Sn), silver (Ag), gold (Au), or an alloy comprised of at least one of the foregoing metals.

The materials of the sealing frame 26 include the epoxy, polyethylene (PE), polypropylene (PP), polyurethane (PU), thermoplastic polyimide (TPI), silicone, acrylic resin and/or ultraviolet light curing adhesive. The sealing frame 26 is disposed between the edges of the two current collectors 24, 25 and surrounds the electrochemical system 201. Also, the sealing frame 26 adheres the two current collectors 24, 25 and seals the electrolyte system therebetween to avoid leakage. Therefore, due to seal by the sealing frame 26, the electrolyte system do not circulate between any adjacent battery units 20. In other words, the electrolyte system only circulates within respective battery units 10. Therefore, the two current collectors 24, 25 and the sealing frame 26 serve as a package structure of the battery unit 10 to form an independent, sealed and complete module, which can generate power independently.

To enhance adhesion of the sealing frame 26, in case of the silicone is utilized, the sealing frame 26 may include two modified silicone layers 261, 262 and a silicone layer 263 disposed between the two modified silicone layers 261, 262. Please see FIG. 1B, the modified silicone layers 261, 262 are modified by adjusting a proportion of condensation-type silicone and addition-type silicone to enhance adhesion of different materials, i.e. the materials of the current collectors 24, 25 and the silicone layer 263. Therefore, the adhesion between the interfaces of the current collectors 24, 25 and the sealing frame 26 is enhanced. The overall appearance is more complete and the production yield is improved.

Please refer to FIG. 2, the above-mentioned battery units 20 are stacked and the metallized plastic film package 30 is utilized to seal the stacked battery units 20 to form the soft pack battery module of this invention, i.e. a quasi-coin battery module. In this figure, the battery units 20 are stacked in the same orientation. The current collectors 24 with the same polarity are disposed to face up. The lower current collectors 25 will be in direct contact with the current collectors 24 of the adjacent battery units 20 to form a battery cell 40 with series connections. Therefore, the uppermost current collector 24 and the lowermost current collector 25 are the electric power outputs of this battery cell 40. Each battery unit 20 has its individual package structure. There only have charges transferred rather than electrochemical reactions occurred between the adjacent battery units 20. As refer to FIG. 1A, the two current collectors 24, 25 and the sealing frame 26 serve as the package structure of the battery unit 20.

Figure 2A:
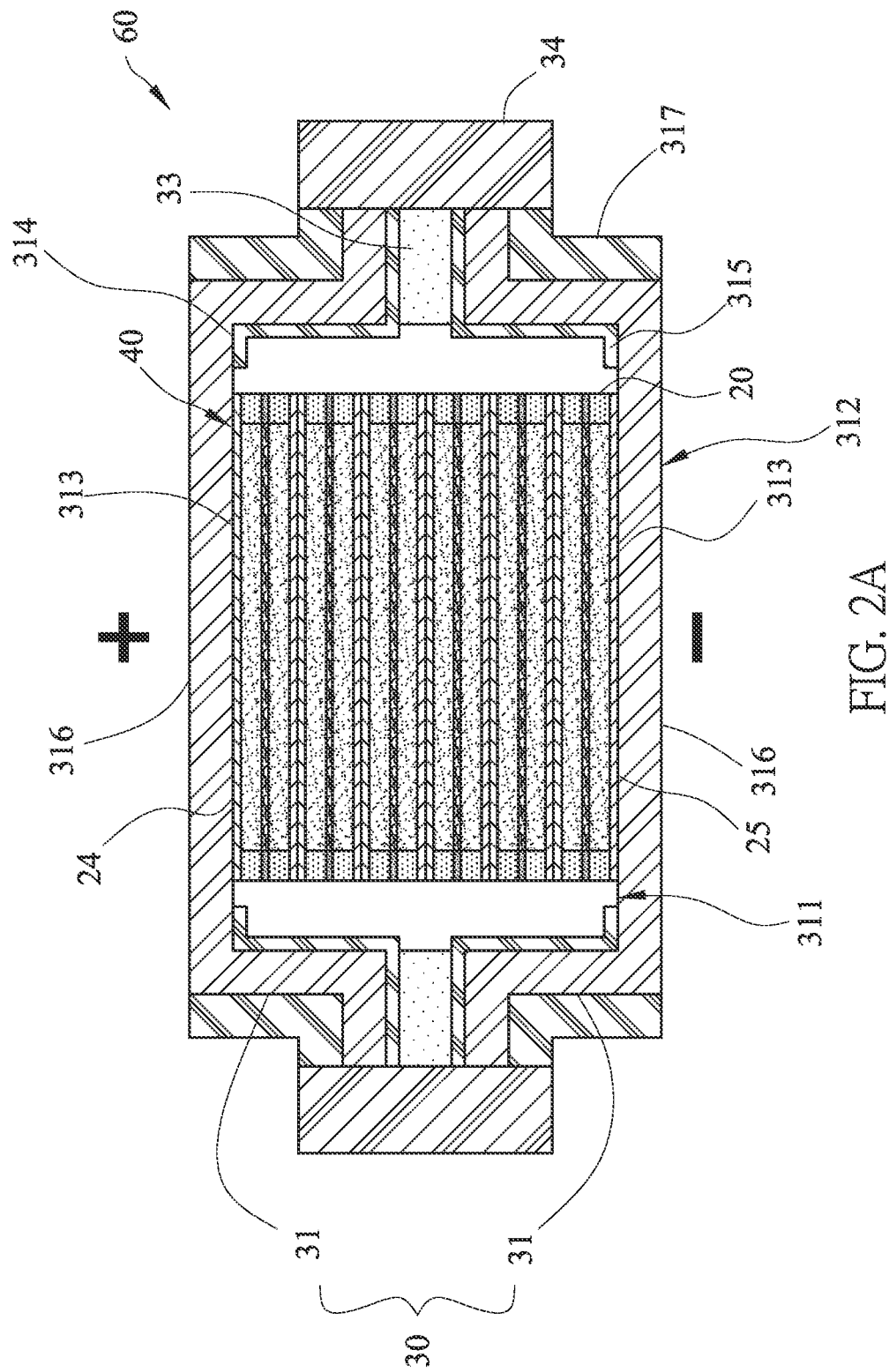
FIG. 2A is schematic diagram of an embodiments of the soft pack battery module with series connections of this invention.
Figure 3A:
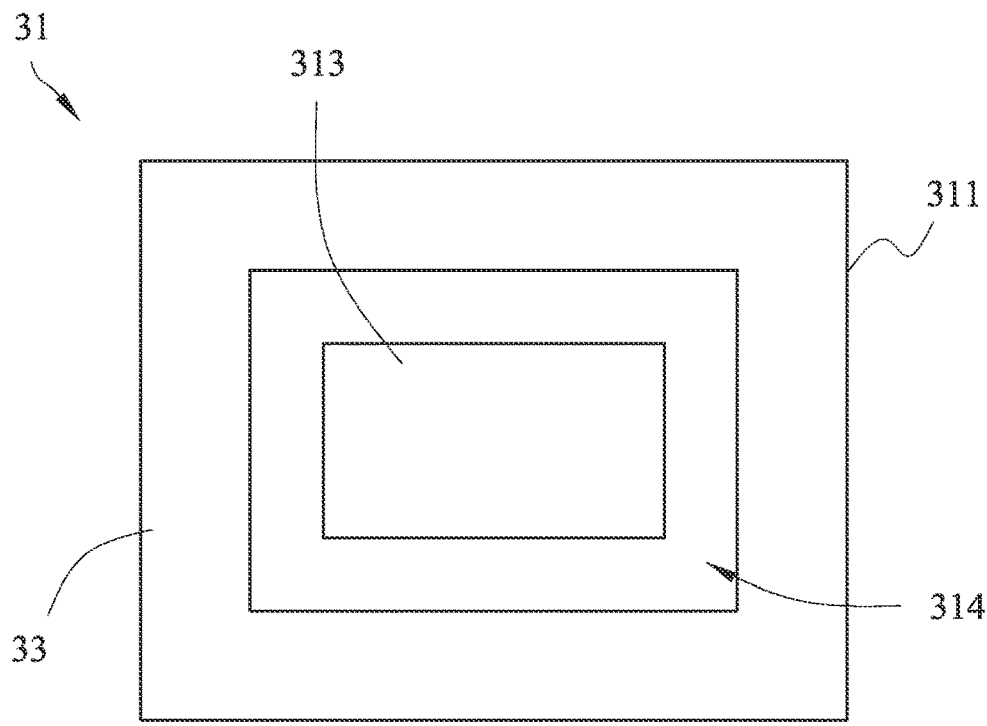
FIGS. 3A and 3B are schematic diagrams of an embodiments of the sheet of the metallized plastic film package of the soft pack battery module of this invention.
Figure 3B:
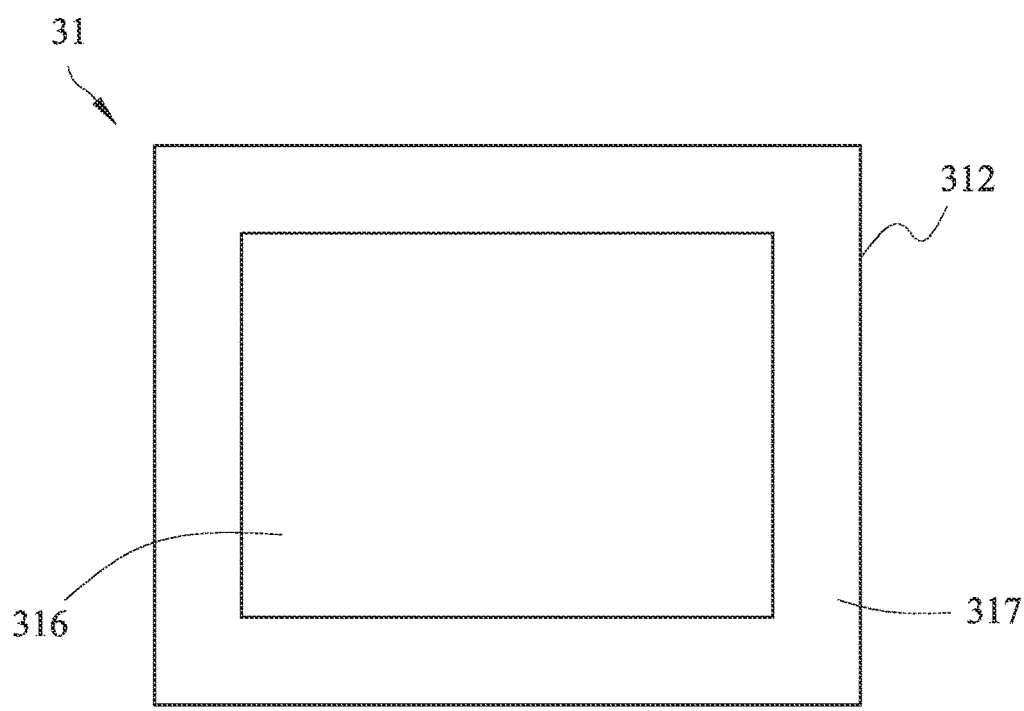

Next, the metallized plastic film package 30 will be explained and described. The metallized plastic film package 30 includes two sheets 31. Please refer to FIGS. 2A, 3A, and 3B, the sheet 31 is composed of a metallized plastic film. The metallized plastic film has an inner surface 311 and an outer surface 312. The inner surface 311 has an inner electrically-conductive area 313 and an inner electrically insulating area 314. The inner electrically insulating area 314 is formed by coating with an inner electrically insulating layer 315 on the inner surface 311, as shown in FIG. 2A. The outer surface 312 has an outer electrically-conductive area 316 and an outer electrically insulating area. The outer electrically insulating area is formed by coating an outer electrically insulating layer 317 on the outer surface 312. The inner electrically-conductive area 313 is electrically connected with the outer electrically-conductive area 316. The presence of the inner electrically insulating layer 315 can insulate the side surface of the battery cell 40 to avoid contact with the metallized plastic film to cause a short circuit. Referring to FIG. 2A, the inner surfaces 311 of the two sheets 31 are disposed opposite each other. An adhesive layer 33 is disposed on parts of the inner electrically insulating area 314 of the inner surface 311 to define as an inner adhering area, as shown in FIG. 3A. By the inner adhering areas, the two sheets 31 are adhered to each other and form a space for the battery cell 40 to be disposed. The two electric power outputs of the battery cell 40, i.e. the uppermost current collector 24 and the lowermost current collector 25 at both ends, are respectively in direct contact with the inner electrically-conductive areas 313 of the sheets 31 to form the electrical connections. Then the electricity can be transmitted outward through the outer electrically-conductive areas 316 of the outer surfaces 312 of the sheets 31.

Figure 2B:
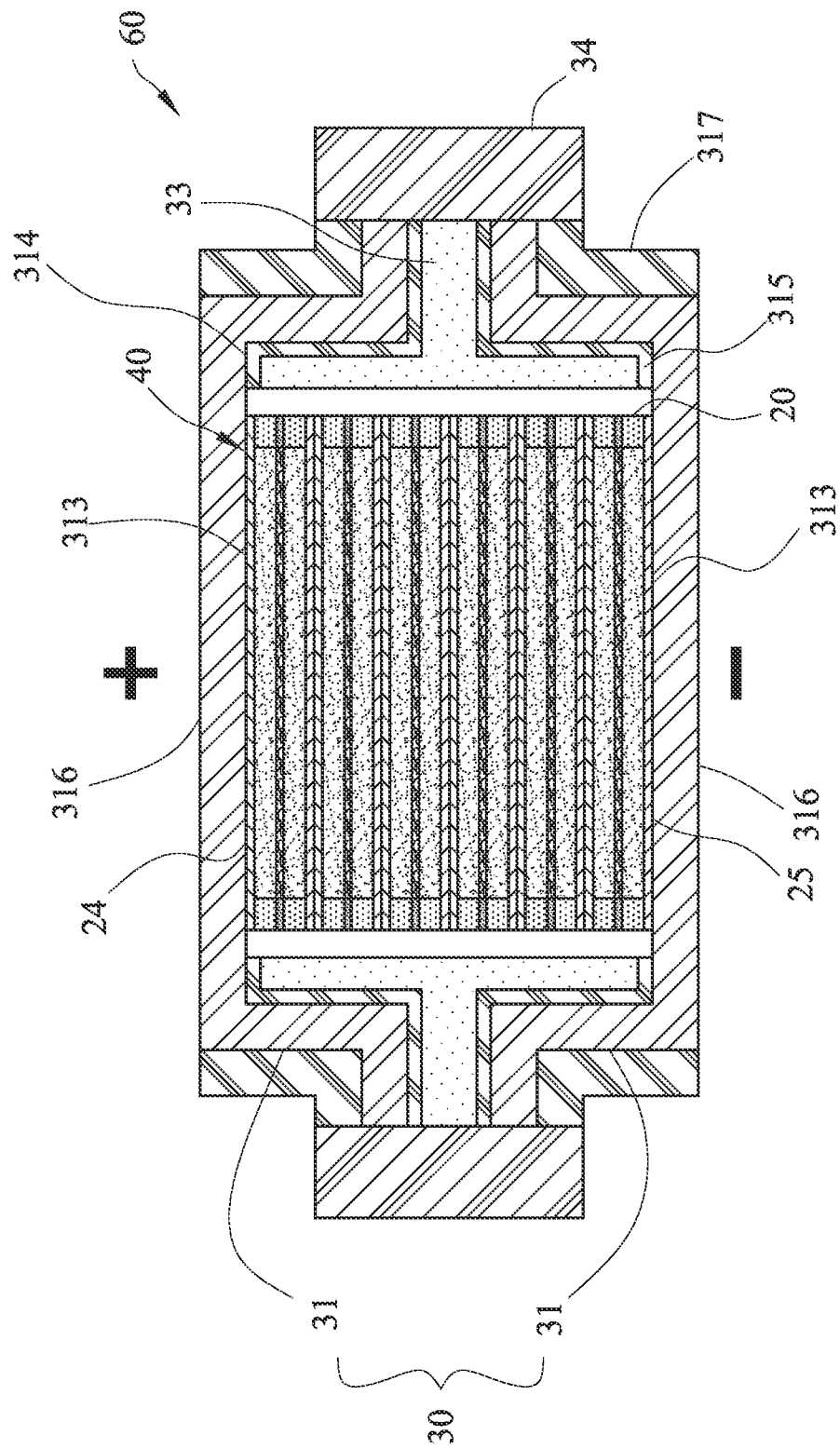
FIGS. 2B-2E are schematic diagrams of the embodiments of the soft pack battery module with different package of this invention.

For the bonding method, the adhesive layer 33 extends to over almost all the inner electrically insulating area 314 of the inner surface 311, as showing in FIG. 2B. Also, an electrically insulating and moisture barrier layer 34 is disposed on an end surface of the boundary between the two sheets 31 to complete the whole package structure.

Figure 2C:
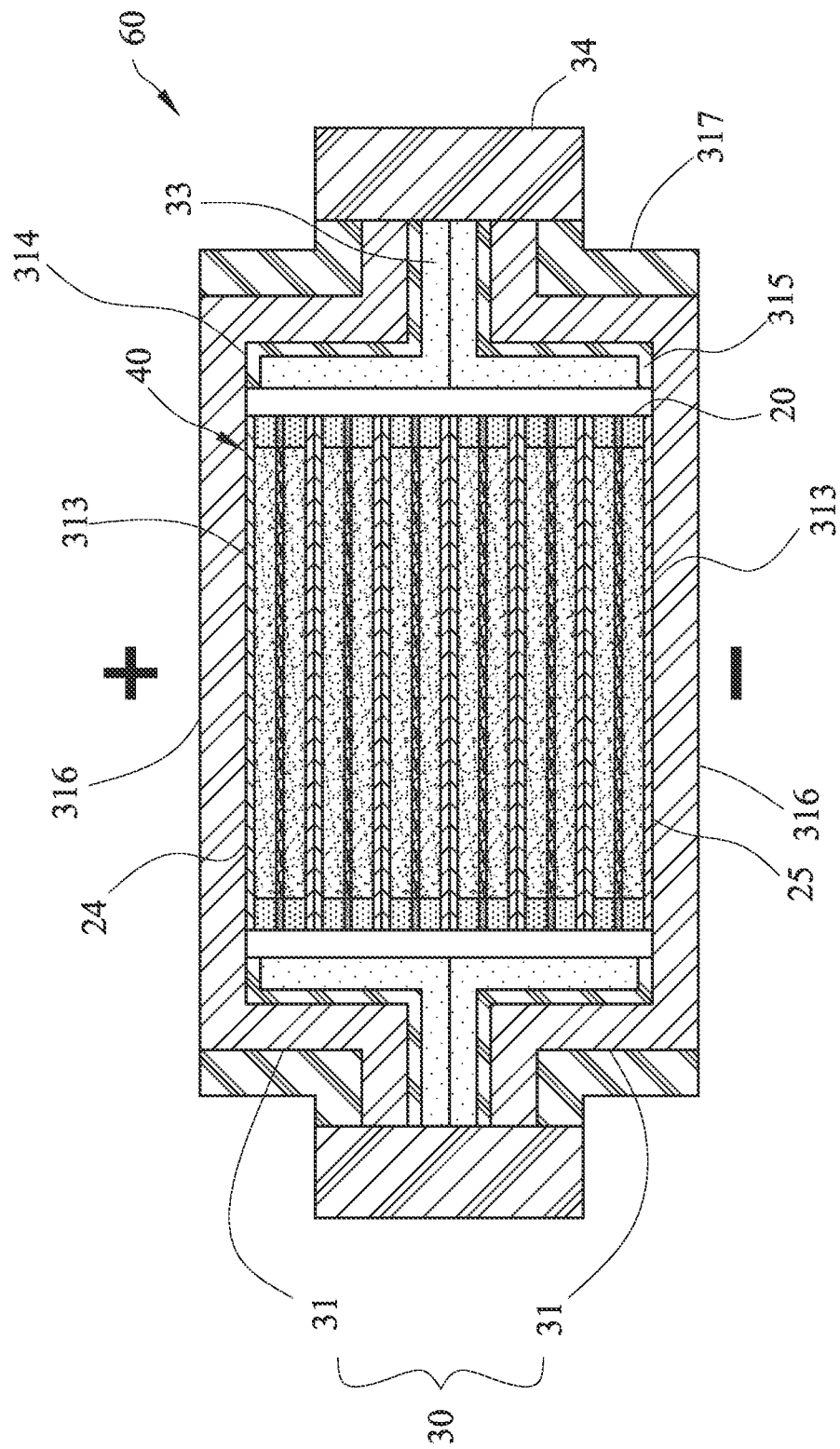
Figure 2D:
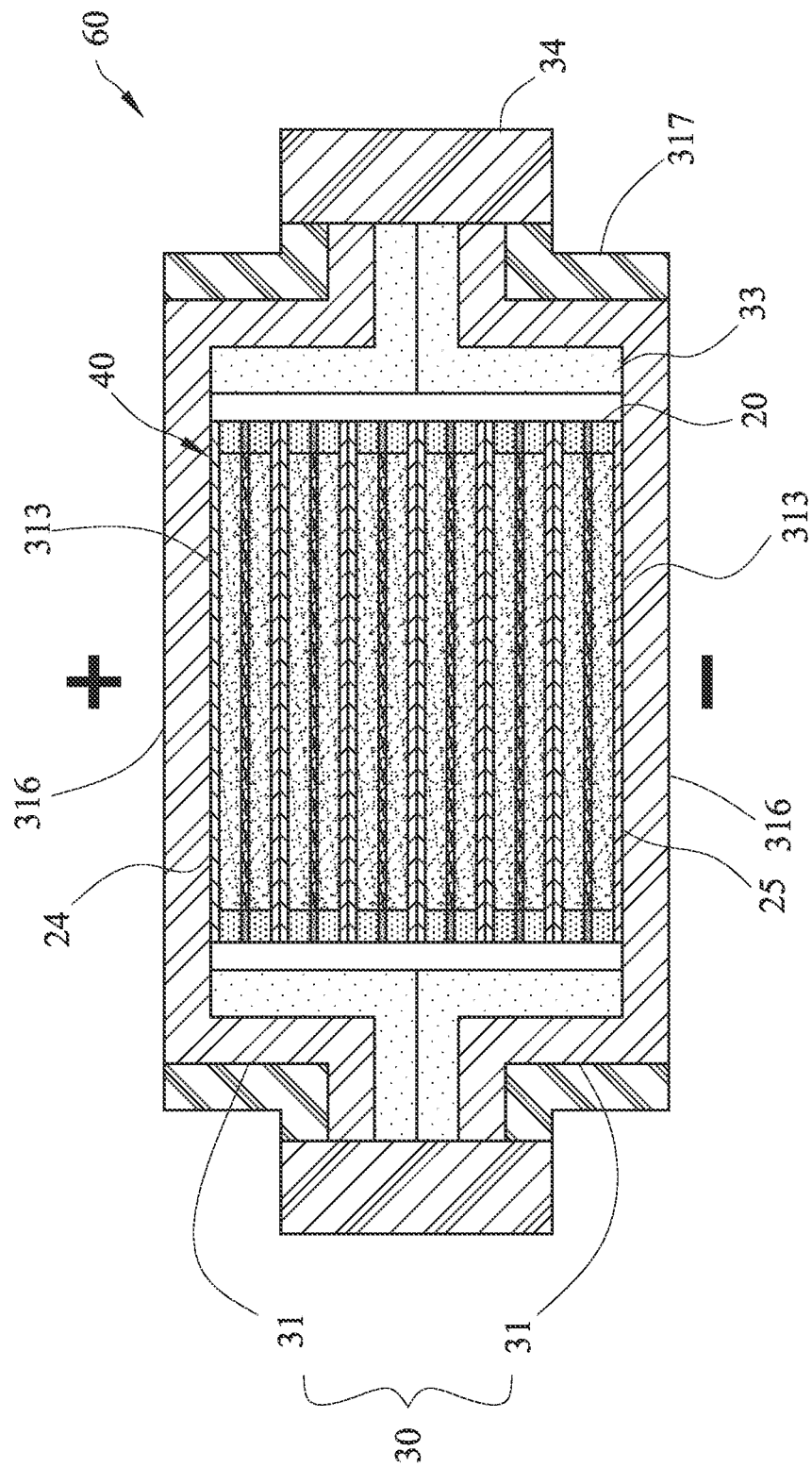
Figure 2E:
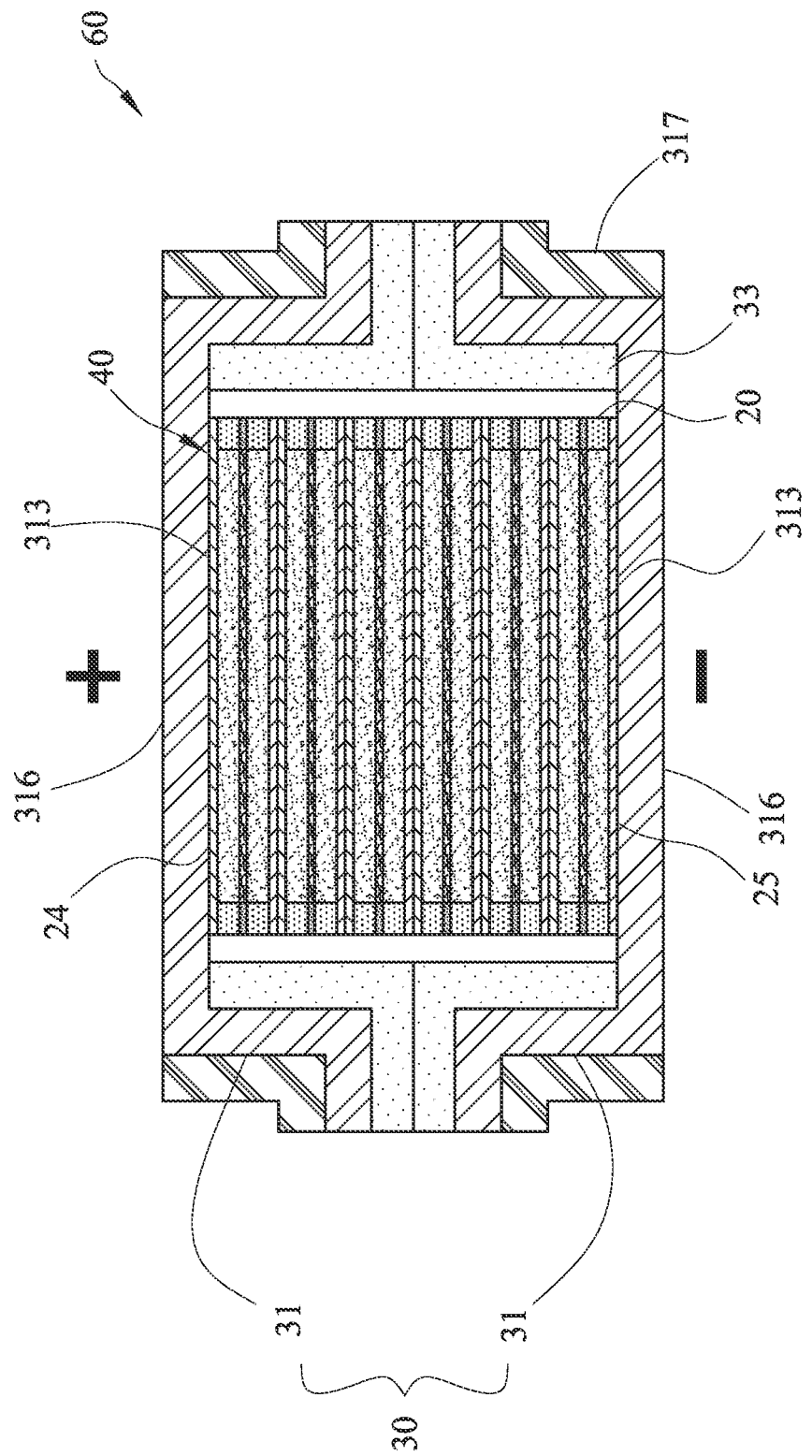

Moreover, please refer to FIG. 2C, the adhesive layer 33 may be formed on both the sheets 31. Therefore, a two-layered adhesive layer 33 can be achieved. Further, please refer to FIG. 2D, in case of the adhesive layer 33 is electrical insulation, the adhesive layer 33 is disposed on the inner surface 311 to form the inner electrically insulating area 314. The inner electrically insulating layer can be omitted.

The material of the adhesive layer 33 may be composed of polyethylene or polypropylene. Also, the adhesive layer 33 can be made of the same material as the sealing frame 26 of the battery unit 20. The main functions of the adhesive layer 33 is not only to adhere the two cover sheets 31, but also to offer sufficient electrical insulation and moisture barrier. Furthermore, if it is considered that the adhesive layer 33 has sufficient electrical insulation and moisture barrier, the electrically insulating and moisture barrier layer 34 at the edge can be omitted, see FIG. 2E.

Figure 4:
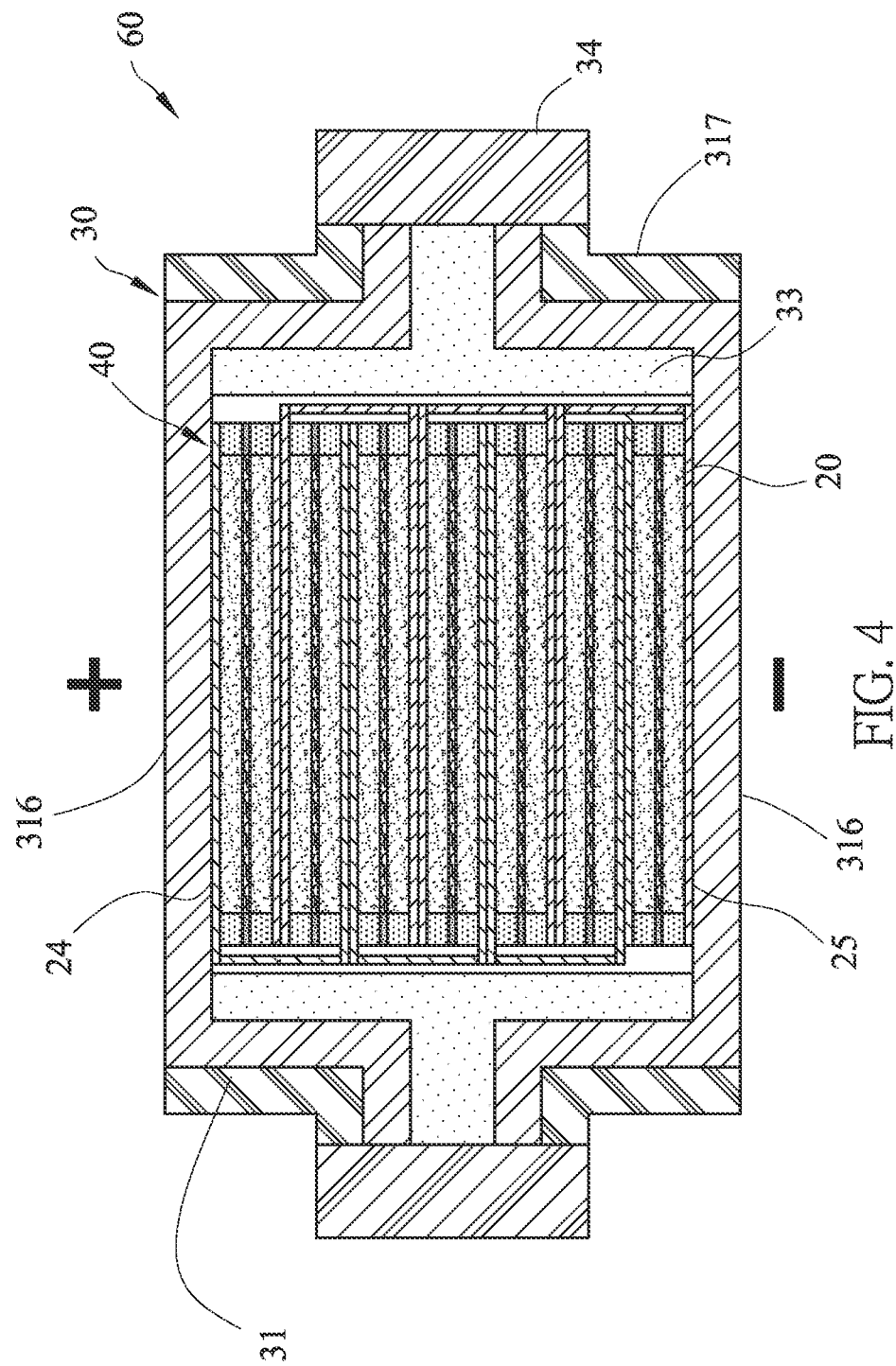
FIG. 4 is schematic diagram of an embodiments of the soft pack battery module with parallel connections of this invention.

Please refer to FIG. 4, which is a schematic diagram of the soft pack battery module with connections in parallel. The battery units 20 are stacked in different orientations. It means that the current collectors 24, 25 with the same polarity in direct contact to each other. The tab or terminal is further utilized to connect the current collectors 24, 25 with the same polarity together to form the battery cell 40 with connections in parallel. The package structure or contacting is the same, and will not be repeated here.

Figure 5:
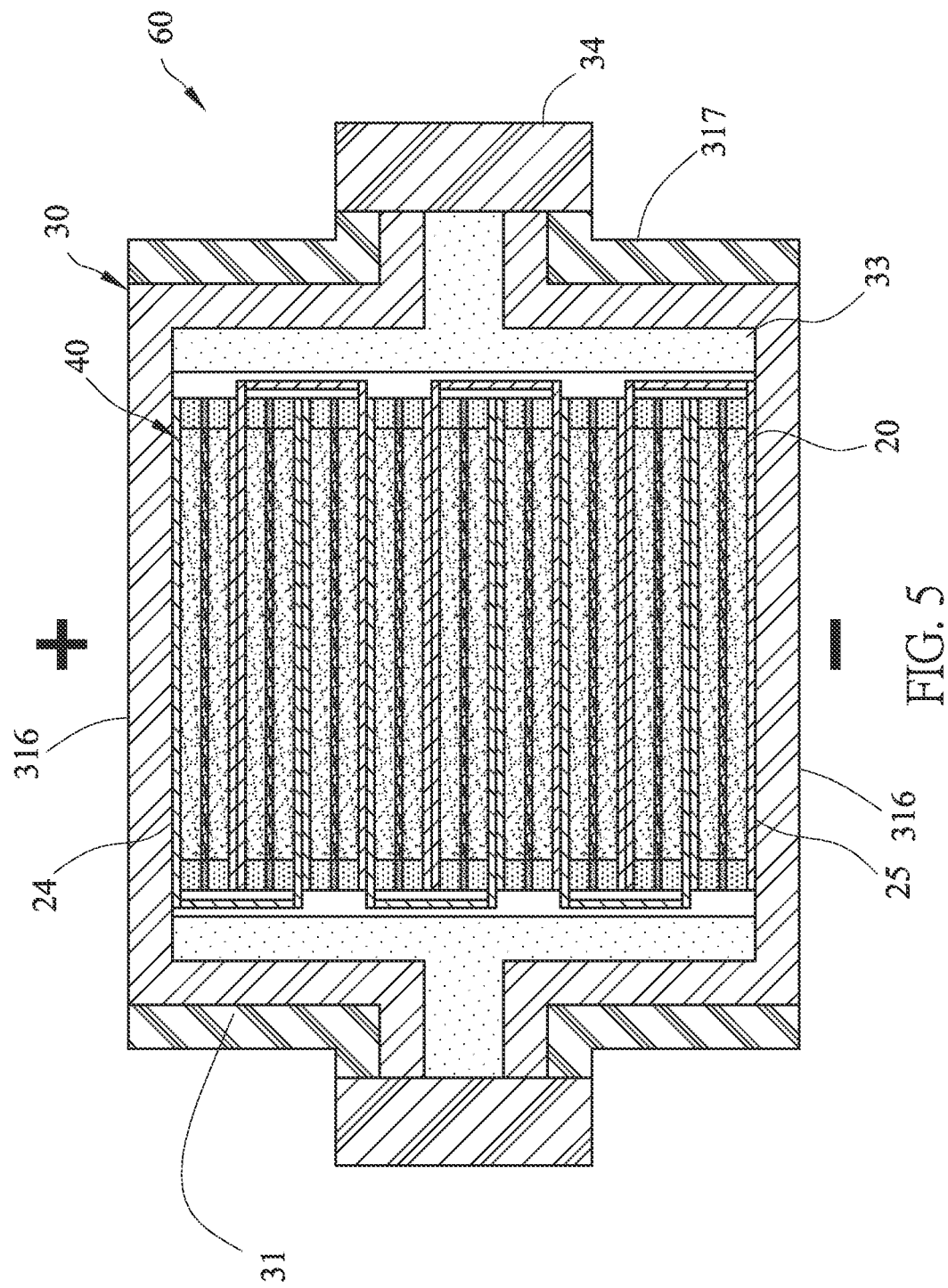
FIG. 5 is schematic diagram of an embodiments of the soft pack battery module with both series and parallel connections of this invention.

Please see FIG. 5, both series and parallel connections are arranged, which can be modified according to actual usage requirements, such as capacitance, voltage, etc. The following description is only explained according to figure.

Three battery units 20 are connected in parallel as a group, and the parallel connection is the same as that in the above-mentioned description of FIG. 4. Then the three parallel groups are connected in series. Similarly, the series connection is the same as that in the above-mentioned description of FIG. 2A. Therefore, both series and parallel connections can be made.

Also, a fire retardant is filled between the metallized plastic film package 30 and the battery cell 40 to enhance the safety of the battery device.

Figure 6A:
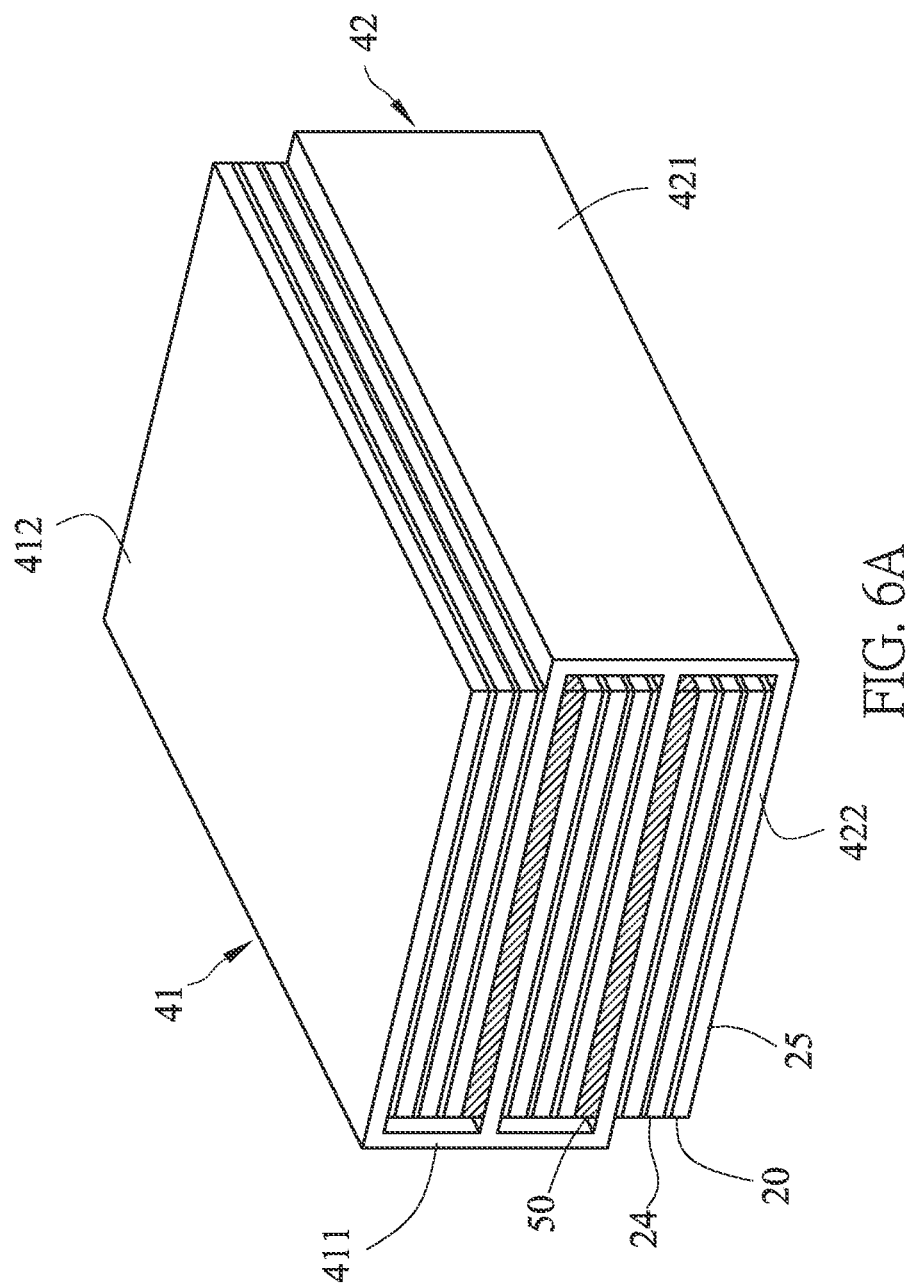
FIGS. 6A and 6B are schematic diagrams of an embodiments of the battery unit combining with the heat dissipating leads of the soft pack battery module of this invention.
Figure 6B:
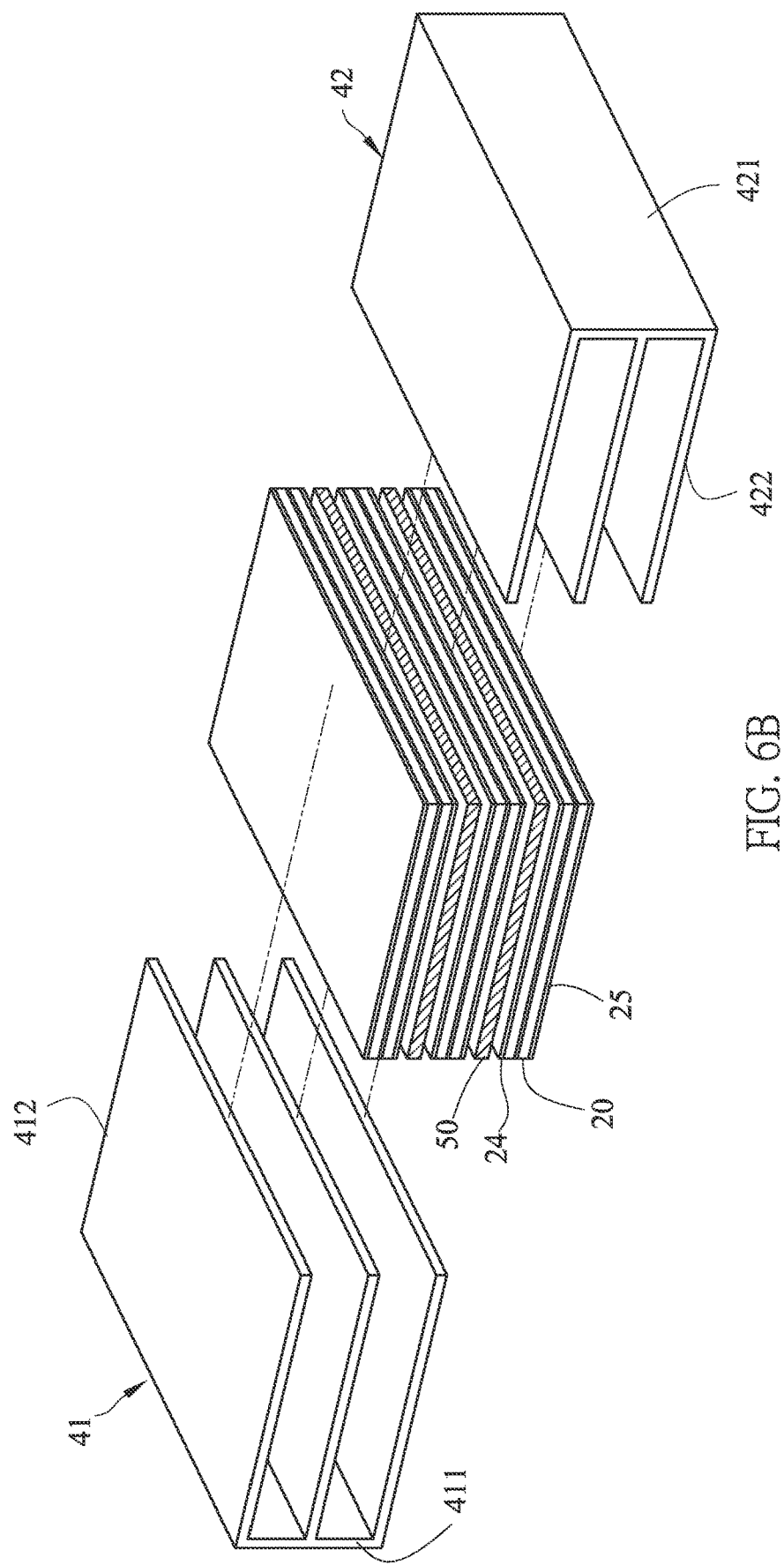

Moreover, as showing in FIGS. 6A and 6B, the heat dissipating leads are adapted to improve heat dissipation. The heat dissipating leads include a positive heat dissipating lead 41 and a negative heat dissipating lead 42. The positive heat dissipating lead 41 includes a plate body 411 and a plurality of extension plates 412, and the negative heat dissipating lead 42 includes a plate body 421 and a plurality of extension plates 422. The extension plates 412 of the positive heat dissipating lead 41 contact with a surface of the current collectors 24 with positive polarity and the extension plates 422 of the negative heat dissipating lead 42 contact with a surface of the current collectors 25 with negative polarity.

In this embodiment, the battery units 20 of the battery cell 40 are stacked in the same orientation. In other words, the current collectors 24 of the same polarity are all disposed to face up, and are connected in direct contact with the extension plates 412 of the positive heat dissipating lead 41.

Similar, the current collectors 25 of the other polarity are all facing down and are in direct contact with the extension plates 422 of the negative heat dissipating lead 42 for electrical connections. That is, the extension plates 412 of the positive heat dissipating lead 41 and the extension plates 422 of the negative heat dissipating lead 42 are alternately arranged to form the parallel connection. Therefore, the positive heat dissipating lead 41 and the negative heat dissipating lead 42 are both made of electrically conductive materials. Also, in order to avoid short circuits caused from contacting of the extension plate 412 of the positive heat dissipating lead 41 located in the middle from with the extension plates 422 of the negative heat dissipating lead 42, an electrically insulating plate 50 can be added therebetween for electrical isolation. The large-area contact structure can effectively dissipate the heat generated by the battery cell 40 to maintain the best performance of the battery cell 40.

Figure 7A:
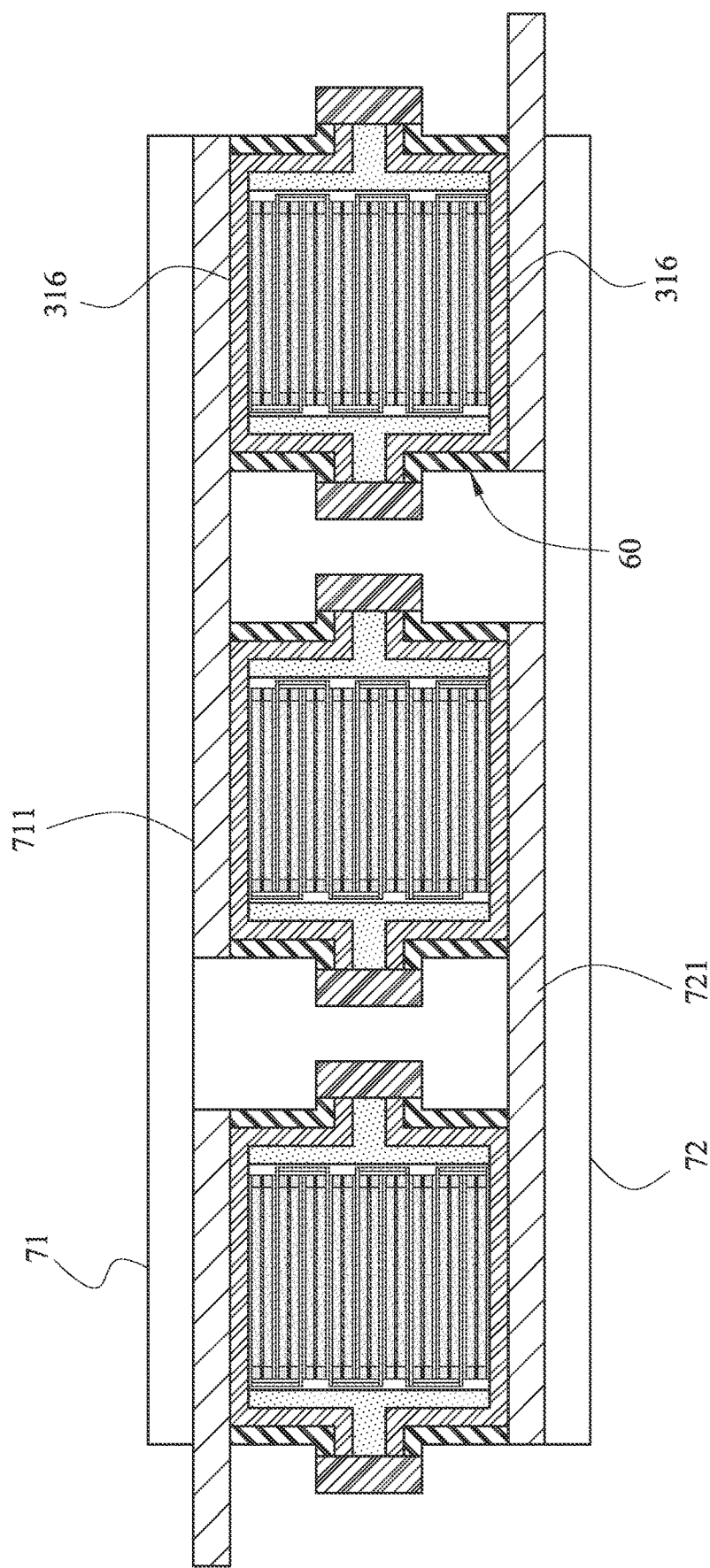
FIGS. 7A and 7B are schematic diagrams of an embodiments of the electricity supply composed of the soft pack battery modules of this invention.

In practice, the soft pack battery module 60 formed by the battery cells 40 encapsulated in the metallized plastic film package 30 can be considered as a battery element. A plurality of battery elements are utilized to be connected together in series, in parallel or both, to form an electricity supply with sufficient capacity and voltage. Please refer to FIG. 7A, the soft pack battery module 60, as disclosed in the FIG. 5, is disposed between the first electrically insulating layer 71 with a first patterned metal layer 711 and the second electrically insulating layer 72 with a second patterned metal layer 721. The second patterned metal layer 721 of the second electrically insulating layer 72 is opposed to the first patterned metal layer 711 of the first electrically insulating layer 71. The outer electrically-conductive areas 316 of the soft pack battery module 60 are directly contacted to the first patterned metal layer 711 and the second patterned metal layer 721 to form electrical connections.

Figure 7B:
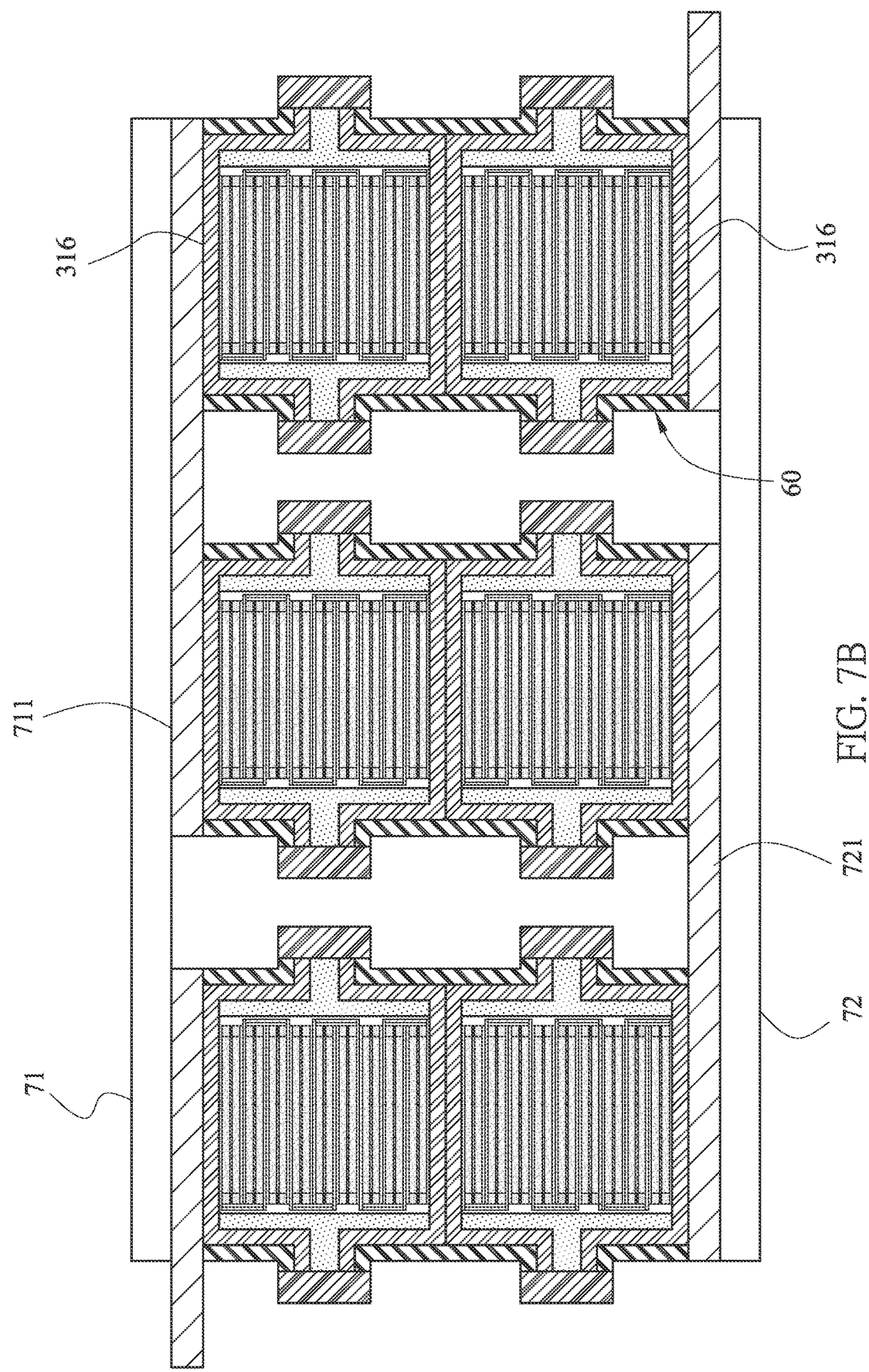

Moreover, a plurality of soft pack battery modules 60 are arranged to form at least one vertical group, i.e. along with the Z-axis, to dispose and distribute between the first electrically insulating layer 71 and the second electrically insulating layer 72. Please see FIG. 7B, each of the vertical groups include at least one soft pack battery module 60 and the outer electrically-conductive areas 316 of the outermost soft pack battery module 60 of the vertical group are directly contacted to the first patterned metal layer 711 and the second patterned metal layer 721 to form electrical connections in a horizontal direction, i.e. along with the X-axis, parallel to the first electrically insulating layer 711 and the second electrically insulating layer 721. As mentioned above, the adopted soft pack battery module 60 is not limited to the one shown in FIG. 5, but can also adopt the soft pack battery module 60 shown in FIG. 2 or 4, or any other arrangements not shown above. Also, the stacking and connection of the soft pack battery module 60 are not only limited to that shown in FIGS. 7A and 7B, but also can be stacked and connected in any directions. For the arrangements in multi-axis, please also see the US20200052341A1, US20200052000A1 or AU2021101083 for more details.

Accordingly, the invention provides a soft pack battery module and its electricity supply thereof. The battery cell is stacked by the battery units with complete and individual package to connect in series, in parallel or both. The metallized plastic film package is utilized to seal the battery cell to form the soft pack battery module. The inner electrically-conductive areas of the shells of the metallized plastic film package are used to form electrical connections with the electric power outputs of the battery cell. And the exposed outer electrically-conductive areas of the shells are used to transmit the electricity. Therefore, the additional transmission structure, such as wires, of the conventional aluminum plastic film battery can be omitted. The current path of the battery cell can be maximized. Furthermore, the soft pack battery modules are stacked vertically and the outer electrically-conductive areas can be used to form electrical connections therebetween directly, without the need for additional wires. Therefore, it can improve the efficiency of the assembling process. And it is easy to replace when a single soft pack battery module is failed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A soft pack battery module, comprising:
a battery cell, including a plurality of stacked battery units and two electric power outputs, wherein the plurality of stacked battery units is connected in series, in parallel or both, and each of the plurality of stacked battery units has an individual package structure to make charge transfer occur between two adjacent ones of the plurality of stacked battery units without an electrochemical reaction; and
a metallized plastic film package, packing the battery cell and including two sheets and an adhesion layer, each of the two sheets having an inner surface and an outer surface, the inner surface having an inner electrically-conductive area and the outer surface having an outer electrically-conductive area, wherein the inner electrically-conductive area is electrically connected with the outer electrically-conductive area, and the adhesion layer is adhered to parts of the inner surface of each of the two sheets to pack the battery cell;
wherein entire surfaces of the two electric power outputs of the battery cell are electrically connected directly with the inner electrically-conductive area of each of the two sheets respectively;
wherein the metallized plastic film package has a top outermost surface and a bottom outermost surface corresponding respectively to the outer surfaces of the two sheets and to a first polarity and a second polarity, the top outermost surface and the bottom outermost surface acting respectively as the two electric power outputs;
wherein each of the plurality of stacked battery units comprises:
two current collectors, disposed in parallel to each other;
an electrochemical system, disposed between the two current collectors, comprising:
two active material layers, being in contact with the two current collectors respectively; and
a separator, disposed between the two active material layers; and
a sealing frame, disposed between the two current collectors and adhered to the two current collectors to surround the electrochemical system;
wherein the two current collectors and the sealing frame serve as the individual package structure of each of the plurality of stacked battery units; and
wherein the uppermost current collector and the lowermost current collector of the stacked battery units at ends of the battery cell are respectively in direct contact with the inner electrically-conductive areas of the sheets to form electrical connections.

2. The soft pack battery module of claim 1, wherein two outermost current collectors of the plurality of stacked battery units respectively contact the inner surfaces of the two sheets.

3. The soft pack battery module of claim 1, further comprising a positive heat dissipating lead and a negative heat dissipating lead, each of the positive heat dissipating lead and the negative heat dissipating lead including a plate body and a plurality of extension plates, wherein the plurality of extension plates of the positive heat dissipating lead contacts a surface of each of the current collectors with positive polarity and the plurality of extension plates of the negative heat dissipating lead contacts a surface of each of the current collectors with negative polarity.

4. The soft pack battery module of claim 1, wherein the electrochemical system further comprises an electrolyte impregnated in the two active material layers, wherein the electrolyte is a gel electrolyte, a liquid electrolyte, a polymer solid electrolyte, an ionic liquid or a combinations thereof, and the electrolyte system only circulates within each of the plurality of stacked battery units.

5. The soft pack battery module of claim 1, wherein the plurality of stacked battery units is stacked via direct contact of the two current collectors.

6. The soft pack battery module of claim 1, wherein the separator is composed of ceramic powders and an adhesive used to bind the ceramic powders.

7. The soft pack battery module of claim 1, wherein a fire retardant is filled between the metallized plastic film package and the battery cell.

8. The soft pack battery module of claim 1, wherein each of the two sheets includes a metallized plastic film, and parts of an inner surface of the metallized plastic film are coated with an inner electrically insulating layer to form an inner electrically insulating area, and wherein the outer electrically-conductive area is greater than the inner electrically-conductive area.

9. The soft pack battery module of claim 8, wherein the parts of the inner surface of the metallized plastic film are coated with the adhesion layer to form an inner electrically insulating area, the adhesion layer is disposed between the inner electrically insulating layers, and the adhesion layer extends to over almost all the inner electrically insulating area of the inner surface of the metallized plastic film.

10. The soft pack battery module of claim 9, further comprising an electrically insulating and moisture barrier layer disposed on an end surface of a boundary between the two sheets, and an outer electrically insulating layer coated on an outer electrically insulating area of the outer surface.

11. An electricity supply composed of the soft pack battery modules of claim 1, comprising:
 a first electrically insulating layer, having a first patterned metal layer on one surface;
 a second electrically insulating layer, having a second patterned metal layer on one surface, and the second patterned metal layer opposed to the first patterned metal layer; and
 a plurality of soft pack battery modules, arranged to form at least one vertical group to dispose and distribute between the first electrically insulating layer and the second electrically insulating layer, each of the at least one vertical group including at least one soft pack battery module and the outer electrically-conductive areas of the outermost soft pack battery module of the at least one vertical group being directly contacted to the first patterned metal layer and the second patterned metal layer to form electrical connections in a horizontal direction parallel to the first electrically insulating layer and the second electrically insulating layer.

12. The electricity supply of claim 11, wherein the soft pack battery module of the at least one vertical group is contacted to an adjacent soft pack battery module via the direct contact of the outer electrically-conductive areas.

13. A soft pack battery module, comprising:
 a battery cell, including a plurality of stacked battery units and two electric power outputs, wherein the plurality of stacked battery units is connected in series, in parallel or both, and each of the plurality of stacked battery units has an individual package structure to make charge transfer occur between two adjacent ones of the plurality of stacked battery units without an electrochemical reaction; and
 a metallized plastic film package, packing the battery cell and including two sheets and an adhesion layer, each of the two sheets having an inner surface and an outer surface, the inner surface having an inner electrically-conductive area and the outer surface having an outer electrically-conductive area, wherein the inner electrically-conductive area is electrically connected with the outer electrically-conductive area, and the adhesion layer is adhered to parts of the inner surface of each of the two sheets to pack the battery cell;
 wherein entire surfaces of the two electric power outputs of the battery cell are electrically connected directly with the inner electrically-conductive area of each of the two sheets respectively;
 wherein the metallized plastic film package has a top outermost surface and a bottom outermost surface corresponding respectively to the outer surfaces of the two sheets and to a first polarity and a second polarity, the top outermost surface and the bottom outermost surface acting respectively as the two electric power outputs;
 wherein each of the plurality of stacked battery units comprises:
 two current collectors, disposed in parallel to each other;
 an electrochemical system, disposed between the two current collectors, comprising:
  two active material layers, being in contact with the two current collectors respectively; and
  a ceramic separator, disposed between the two active material layers; and
 a sealing frame, disposed between the two current collectors and adhered to the two current collectors to surround the electrochemical system;
 wherein the two current collectors and the sealing frame serve as the individual package structure of each of the plurality of stacked battery units;
 wherein the uppermost current collector and the lowermost current collector of the stacked battery units at ends of the battery cell are respectively in direct contact with the inner electrically-conductive areas of the sheets to form electrical connections; and
 wherein the inner electrically-conductive area is greater than areas of the uppermost current collector and the lowermost current collector of the stacked battery units.

* * * * *